US012131358B1

(12) United States Patent
Rao Karikurve et al.

(10) Patent No.: US 12,131,358 B1
(45) Date of Patent: Oct. 29, 2024

(54) SELECTING A LOCATION FOR ORDER FULFILLMENT BASED ON MACHINE LEARNING MODEL PREDICTION OF INCOMPLETE FULFILLMENT OF THE ORDER FOR DIFFERENT LOCATIONS

(71) Applicant: Maplebear, Inc., San Francisco, CA (US)

(72) Inventors: Sharath Rao Karikurve, San Francisco, CA (US); Abhay Pawar, San Francisco, CA (US); Shishir Kumar Prasad, Fremont, CA (US)

(73) Assignee: Maplebear, Inc., San Francisco, CA (US)

( * ) Notice: Subject to any disclaimer, the term of this patent is extended or adjusted under 35 U.S.C. 154(b) by 746 days.

(21) Appl. No.: 16/816,226

(22) Filed: Mar. 11, 2020

(51) Int. Cl.
  *G06Q 30/0601* (2023.01)
  *G06N 20/00* (2019.01)
  *G06Q 10/0875* (2023.01)
  *G06Q 20/40* (2012.01)
  (Continued)

(52) U.S. Cl.
  CPC ......... *G06Q 30/0605* (2013.01); *G06N 20/00* (2019.01); *G06Q 10/0875* (2013.01); *G06Q 20/407* (2013.01); *G06Q 30/0205* (2013.01); *G06Q 30/0623* (2013.01); *G06Q 30/0631* (2013.01); *G06Q 30/0635* (2013.01); *G06Q 30/0639* (2013.01); *G06N 7/01* (2023.01)

(58) Field of Classification Search
  CPC .... G06N 7/005; G06N 20/00; G06Q 10/0875; G06Q 30/0205; G06Q 30/06–0645; G06Q 30/08; G06Q 50/01; G16Y 10/00–90
  See application file for complete search history.

(56) References Cited

U.S. PATENT DOCUMENTS

| 10,163,070 B1 * | 12/2018 | Phillips | G06Q 10/0834 |
| 10,242,336 B1 * | 3/2019 | Agarwal | G06Q 10/083 |
| 10,818,186 B2 * | 10/2020 | Ripert | G06Q 30/0635 |

(Continued)

FOREIGN PATENT DOCUMENTS

| CA | 3121006 A1 * | 7/2020 | G06Q 10/087 |

OTHER PUBLICATIONS

Glaeser, Chloe Kim. 2019. "Using Data to Optimize the Fulfillment and Location Decisions of an Online Grocery Retailer." Order No. 13863217, University of Pennsylvania. https://dialog.proquest.com/professional/docview/2278078261?accountid=131444. (Year: 2019).*

(Continued)

*Primary Examiner* — Adam L Levine
(74) *Attorney, Agent, or Firm* — Fenwick & West LLP

(57) ABSTRACT

In an online concierge system, a shopper retrieves items specified in an order by a customer from a retail location. The online concierge system optimizes order fulfillment by selecting a retail location for an order that is most time-efficient and that is most likely to have each of the item in the order available. Hence, the online concierge system may select a less convenient retail location that is more likely to have each item being ordered available. To predict whether a retail location incompletely fulfill the order if selected to fulfill the order, the online concierge system trains a machine learning model based on prior orders fulfilled by the retail location, a shopper retrieving items in the order, items in the order, and other features.

20 Claims, 7 Drawing Sheets

(51) Int. Cl.
*G06Q 30/0204* (2023.01)
*G06N 7/01* (2023.01)

(56) References Cited

U.S. PATENT DOCUMENTS

| | | | |
|---|---|---|---|
| 11,348,161 B2* | 5/2022 | Chandra Sekar Rao | ................... G06Q 10/0635 |
| 11,544,810 B2* | 1/2023 | Rao | .................. G06Q 10/06315 |
| 2016/0042315 A1* | 2/2016 | Field-Darragh | ......... H04B 5/77 705/28 |
| 2017/0178221 A1* | 6/2017 | Mccorry | .............. G06Q 10/087 |
| 2019/0236740 A1* | 8/2019 | Rao | ........................ G06N 20/20 |

OTHER PUBLICATIONS

Kutzelnigg, "Optimal Allocation of Goods in a Warehouse: Minimizing the Order Picking Costs under real-life Constraints," 3rd IEEE International Symposium on Logistics and Industrial Informatics (LINDI), Budapest, Hungary, Aug. 25-27, 2011, pp. 65-70. (Year: 2011).*

* cited by examiner

SELECTING A LOCATION FOR ORDER FULFILLMENT BASED ON MACHINE LEARNING MODEL PREDICTION OF INCOMPLETE FULFILLMENT OF THE ORDER FOR DIFFERENT LOCATIONS

BACKGROUND

This disclosure relates generally to determining a location for fulfilling an order from a customer of an online concierge system. More particularly, this disclosure relates to an online concierge system selecting a location for fulfilling an order based on a prediction from a machine learning model of the order being fulfilled if the location is selected.

In current online concierge systems, a customer adds goods to an online shopping cart from a list of goods offered by a retail location. These goods create the customer's order, which is retrieved by a shopper at the retail location who "shops" for the customer. Though a customer may initially specify goods in the order, the shopper may encounter issues as they fulfill the customer's order at a retail location. For example, the retail location may be out of stock of a good in the order, low in stock of a good in the order, or low in quality of a good in the order. Issues in a retail location having goods for fulfilling the customer's order may be addressed in various ways. For example, a customer may accept a replacement option suggested by a shopper or request a refund for a good that is unavailable from the retail location.

However, certain retail locations may be unable to completely fulfill an order from a customer via an online concierge system. For example, a retail location may be out of stock of a good included in a customer's order and also lack an acceptable replacement for the out of stock good. Selecting a retail location that is unable to completely fulfill a customer's order may discourage the customer from placing additional orders with the online concierge system.

SUMMARY

An online concierge system receives an order from a customer that includes one or more items and identifies the customer from which the order was received. The order also includes a location to which items in the order are to be delivered in various embodiments. To fulfill the order, the online concierge system retrieves stored information describing one or more candidate retail locations, also referred to as "locations." In some embodiments, the online concierge system identifies candidate retail locations as retail locations within a threshold distance of a location included in the order. Alternatively, the online concierge system identifies candidate retail locations as retail locations having inventories including at least a threshold amount of goods included in the order. Information describing a candidate retail location includes inventory information describing the candidate retail location's inventory of items.

To select a retail location (also referred to as a "location") from the candidate retail locations to fulfill the received order, the online concierge system accounts for probabilities of different candidate retail locations resulting in an incomplete order. In various embodiments, the online concierge system maintains criteria for identifying an incomplete order. For example, the online concierge system identifies an incomplete order as an order for which the online concierge system performed a refund that was not requested by a consumer from whom the order was received or as an order that included a replacement item for which a consumer from whom the order was received provided negative feedback or previously rejected as a replacement item. The online concierge system may also identify an incomplete order as an order for which the online concierge received a complaint from the consumer from whom the order was received (e.g., the consumer indicated the order was missing an item, the order included an incorrect item, the order included an unacceptable replacement item, etc.).

From information describing previously completed orders, the online concierge system trains a machine-learned model to determine a probability of different candidate retail locations incompletely fulfilling an order. The machine-learned model receives as input different characteristics of an order and characteristics of a retail location to fulfill the order and generates a probability of the retail location incompletely fulfilling the order. Example characteristics of an order include: availability of each item in the order from a retail location fulfilling the order, replaceability of each item in the order for the user from whom the order was received, a number of items in the order, stored information by the online concierge system 102 describing items in the order, and inclusion of items in the order in orders previously identified as incomplete. Example characteristics of a retail location include: a number of departments in the retail location to be accessed to fulfill the order, a number of aisles in the retail location to be accessed to fulfill the order and a location (e.g., a city, a state, or other geographic region) in which the retail location fulfilling the order (or in which the consumer from whom the order was received) is located. In various embodiments, the online concierge system also accounts for characteristics of a shopper fulfilling an order when training the trained machine-learned model to determine a probability of the shopper fulfilling an order at a candidate retail location incompletely fulfilling the order. For example, in addition to characteristics of the order and characteristics of the candidate retail location, the trained machine-learning model also receives characteristics of a shopper fulfilling the order as an input. Example characteristics of a shopper include a propensity of refunds by the online concierge system by orders fulfilled by the shopper, a satisfaction rate by customers of replacement items selected by the shopper, and a historical rate of incomplete orders by the shopper.

In various embodiments, the online concierge system trains the trained machine-learning model based on stored information describing prior fulfillment of orders for different users using different retail locations. For example, the online concierge system applies a label indicating whether a previously fulfilled order was incompletely fulfilled or was completely fulfilled to characteristics of the previously fulfilled order, characteristics of the retail location that fulfilled the previously fulfilled order, and characteristics of a shopper who fulfilled the previously fulfilled order. From the labeled characteristics of the previously fulfilled order, characteristics of the shopper who fulfilled the previously fulfilled order, and characteristics of the retail location that fulfilled the previously fulfilled order, the online concierge system trains the trained machine learning model using any suitable training method or combination of training methods.

After training, the online concierge system applies the trained machine-learned model to characteristics of a received order, characteristics of a candidate retail location for fulfilling the received order, and characteristics of a shopper to fulfill the received order, and the trained machine-learned model outputs a probability of the candidate retail location incompletely fulfilling the received order.

The online concierge system determines a probability of each candidate retail location incompletely fulfilling the received order. In some embodiments, the online concierge system also determines distances between each of the candidate retail locations and a physical location included in the received order. From the likelihoods of each candidate retail location incompletely fulfilling the received order and the distances between each of the candidate retail locations and the physical location included in the received order, the online concierge system selects a candidate retail location to fulfill the received order.

In some embodiments, the online concierge system generates a metric for each candidate retail location, with a metric for a candidate retail location generated by combining a value based on probability of the candidate retail location incompletely fulfilling the order and a value based on a distance from the candidate retail location to the physical location included in the received order. For example, the value based on the probability of the candidate retail location incompletely fulfilling the order is inversely related to the probability of the candidate retail location incompletely fulfilling the order, so the value is greater for candidate retail locations with lower probabilities of incompletely fulfilling the order. Similarly, the value based on a distance from the candidate retail location to the location included in the received order may also be inversely related to the distance from the candidate retail location to the location included in the received order, so the value is greater for candidate retail locations closer to the location included in the received order. The online concierge system may apply different weights to the value based on the probability of the candidate retail location incompletely fulfilling the order and the value based on a distance from the candidate retail location to the location included in the received order when generating the metric for the candidate retail location. In embodiments where the online concierge system applies a larger weight to the value based on probability of the candidate retail location incompletely fulfilling the order, the online concierge system optimizes selection of a retail location of the candidate retail locations for higher quality retail locations that are more likely to result in a shopper completely fulfilling the received order. When characteristics of shoppers fulfilling the received order are used by the trained machine-learned model, the trained machine-learned model allows the online concierge system to select a combination of a shopper and a candidate retail location most likely to completely fulfill the received order. Subsequently, the online concierge system transmits one or more instructions for fulfilling the received order to a client device of the selected shopper for fulfillment at the selected retail location.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Online Concierge System Environment

Figure 1:
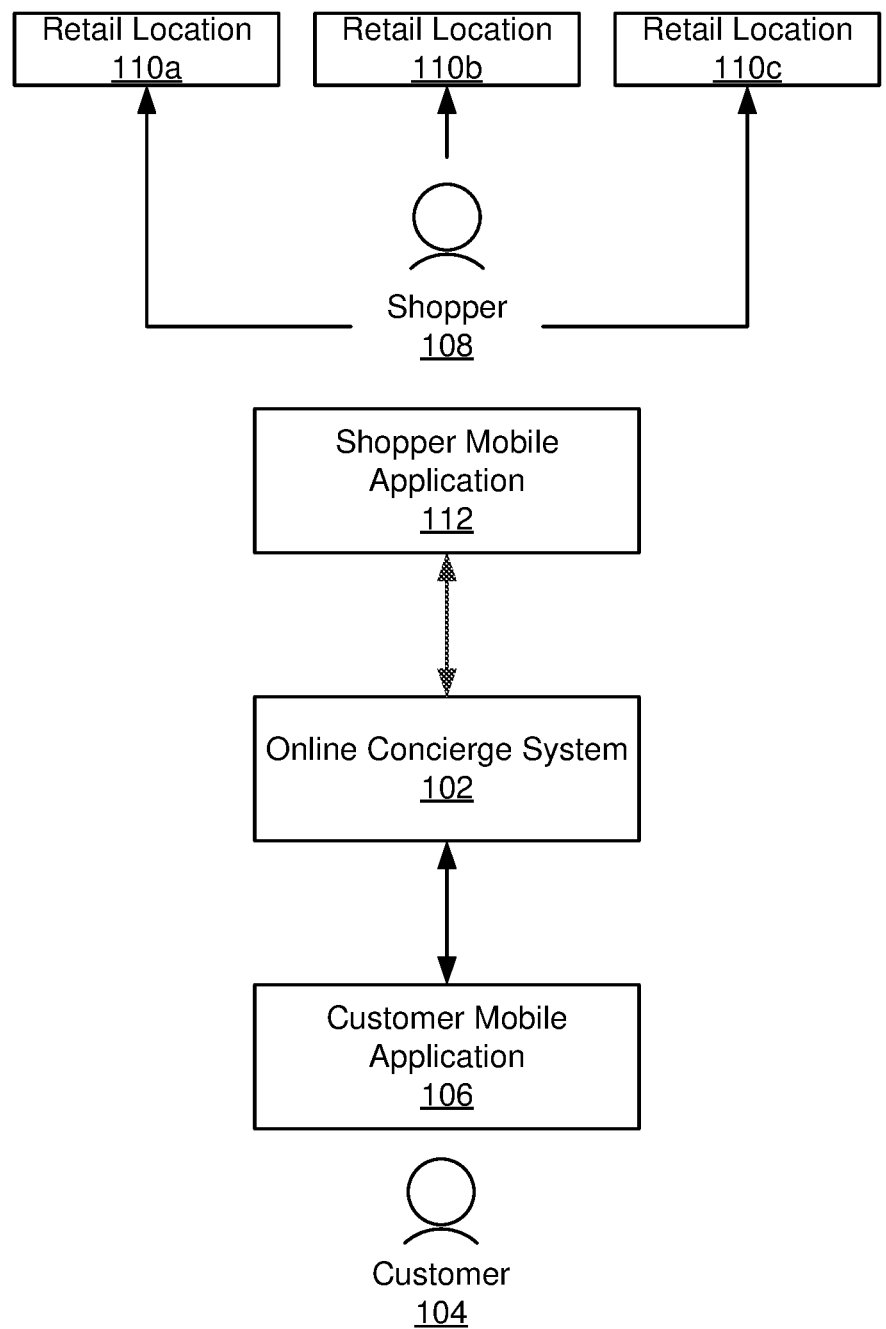
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes the online concierge system 102, which is configured to receive orders from one or more customers 104 (only one is shown for the sake of simplicity). An order specifies a list of goods (items or products) to be delivered to the customer 104. The order also specifies a location to which the goods are to be delivered, and a time window during which the goods should be delivered. In some embodiments, the order specifies one or more retail locations from which the selected items should be purchased. The customer 104 may use a mobile application (MA) 106 configured to communicate with the online concierge system 102 to place the order.

The online concierge system 102 is configured to transmit orders received from customers 104 to one or more shoppers 108. A shopper 108 may be a contractor, an employee, or another person (or entity) who is enabled to fulfill orders received by the online concierge system 102. The environment 100 shown in FIG. 1 also includes three retail locations 110a, 110b, and 110c (only three are shown for the sake of simplicity; the environment 100 could include hundreds of retail locations). The retail locations 110 may be physical retail locations, such as grocery stores, discount stores, department stores, etc., or non-public warehouses storing items that can be collected and delivered to customers 104. Each shopper 108 fulfills an order received from the online concierge system 102 at one or more retail locations 110, delivers the order to the customer 104, or performs both fulfillment and delivery. In one embodiment, shoppers 108 make use of a shopper mobile application 112 which is configured to interact with the online concierge system 102.

Online Concierge System

Figure 2:
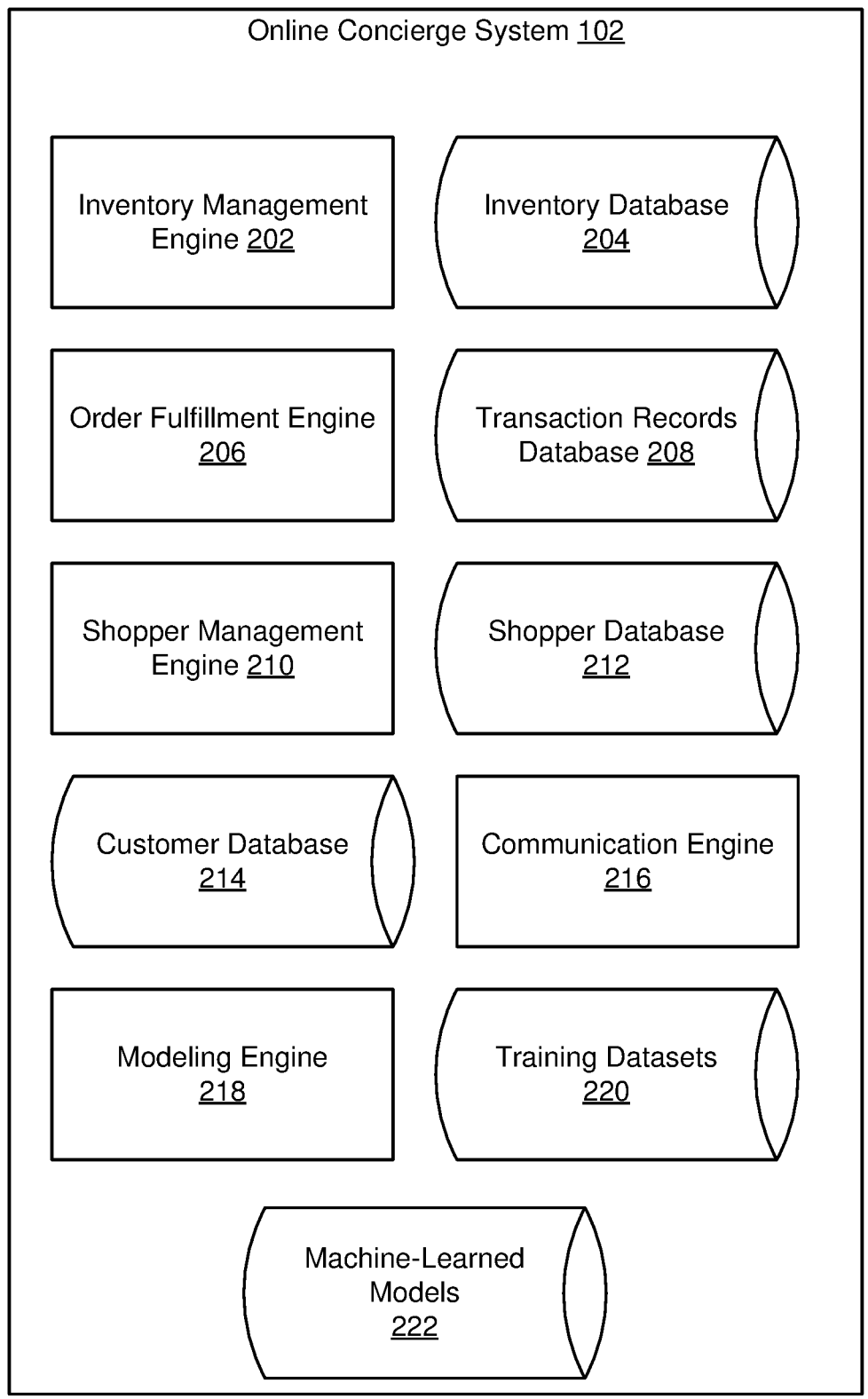
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retail location 110. In one embodiment, the inventory management engine 202 requests and receives inventory information maintained by the retail location 110. The inventory of each retail location 110 is unique and may change over time. The inventory management engine 202 monitors changes in inventory for each participating retail location 110. The inventory management engine 202 is also configured to store inventory records in an inventory database 204. The inventory database 204 may store information in separate records—one for each participating retail location 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the mobile application 106). The order fulfillment engine 206 is also configured to access the inventory database 204 to determine which products are available at which retail locations 110. The order fulfillment engine 206 determines a sale price for each item ordered by a customer 104. Prices set by the order fulfillment engine 206 may or may not be identical to in-store prices determined by retail locations 110 (which is the price that customers 104 and shoppers 108 would pay at retail locations). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 also determines replacement options for items in an order. For each item in an order, the order fulfillment engine 206 may retrieve data describing items in previous orders facilitated by the online concierge system 102, previously selected replacement options for that item, and similar items. Similar items may be items of the same brand or type or of a different flavor. Based on this data, the order fulfillment engine 206 creates a set of replacement options for each item in the order comprising the items from the data. The order fulfillment engine 206 ranks replacement options in the set to determine which items to display to the customer 104. In some embodiments, the order fulfillment engine 206 may rank the replacement options by the number of previous orders containing the replacement option or customer quality ratings gathered by the online concierge system 102. In some embodiments, the order fulfillment engine 206 only uses data for the customer 104 related to the order to suggest replacement options.

In some embodiments, the order fulfillment engine 206 also shares order details with retail location 110. For example, after successful fulfillment of an order, the order fulfillment engine 206 may transmit a summary of the order to the appropriate retail location 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retail location systems. This may be accomplished via use of webhooks, which enable programmatic or system-driven transmission of information between web applications. In another embodiment, retail location systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies an appropriate retail location 110 to fulfill the order based on one or more parameters, such as the contents of the order, the inventory of the retail locations 110, and the proximity to the delivery location. The shopper management engine 210 then identifies one or more appropriate shoppers 108 to fulfill the order based on one or more parameters, such as the shopper's proximity to the appropriate retail location 110 (and/or to the customer 104), the shopper's familiarity level with the selected retail location 110, and so on. Additionally, the shopper management engine 210 accesses a shopper database 212 which stores information describing each shopper 108, such as a shopper's name, gender, rating, previous shopping history, and so on. The shopper management engine 210 transmits the list of items in the order to the shopper 108 via the shopper mobile application 112. The shopper database 212 may also store data describing the sequence in which the shoppers 108 picked the items in their assigned orders.

As part of fulfilling an order, the order fulfillment engine 206 and/or shopper management engine 210 may access a customer database 214 which stores information describing each customer 104. This information could include each customer's name, address, gender, shopping preferences, favorite items, stored payment instruments, and so on. In various embodiments, the customer database 214 stores information identifying a user, identifying an item, and identifying replacement items corresponding to the identified items. This allows the customer database 214 to maintain a listing or a ranking of replacement items for a specific item for a specific user The online concierge system 102 may use a communication engine 216 that transmits information between the customer mobile application 106 and the shopper mobile application 112. The information may be sent in the form of messages, such as texts or emails, or notifications via application, among other forms of communication. The communication engine 216 may receive information from each application about the status of an order, the location of a customer 104 in transit, issues with items in an order, and the like. The communication engine 216 determines a message or notification to send to a customer 104 or shopper 108 based on this information and transmits the notifications to the appropriate application. In one embodiment, the online concierge system 102 may receive messages composed via a customer interface of the shopper mobile application 112 and transmit the messages to the customer mobile application 106 (or vice versa) via the communication engine 216. For example, a shopper 108 may compose, via a shopper order interface, a message indicating that an item of an order is not available. The online concierge system 102 may receive the message from the shopper mobile application 112 and transmit the message to the customer mobile application 106 associated with the order. The customer 104 may interact with a customer ordering interface to indicate a course of action for the item, such as to remove the item from the order. The online concierge system 102 receives this information and transmits it in the form of a message to the shopper mobile application 112.

The modeling engine 218 uses the training datasets 220 to generate one or more machine-learned models 222 stored by the online concierge system 102. For example, a machine-learned model is an item availability model determining an availability (also referred to as an "availability probability") of an item at a retail location 110. As another example, a trained machine learned model determines a probability of an order being incompletely fulfilled at a retail location 110, as further described below in conjunction with FIG. 6. A machine-learned model 222 can learn from the training datasets 220, rather than follow only explicitly programmed instructions. The inventory management engine 202, order fulfillment engine 206, and/or shopper management engine 210 can use one or more of the machine learned models 222 to determine a probability that an item is available at a retail location 110, and may also determine a probability of an order being incompletely fulfilled at a retail location 110 by a shopper. In some embodiments, a machine-learned item availability model may be used to predict item availability for items being displayed to or selected by a customer, or included in received delivery orders. A single machine-learned item availability model is used to predict the availability of any number of items. Similarly, the order fulfillment engine 206 or the shopper management engine 210 may use a machine-learned model determining a probability of an order being incompletely fulfilled to select a retail location 110 or a shopper to fulfill a received order.

A machine-learned item availability model can be configured to receive as inputs information about an item, the retail location 110 for obtaining the item, and the time for obtaining the item. The machine-learned item availability model may be adapted to receive any information that the modeling engine 218 identifies as indicators of item availability. At minimum, the machine-learned item availability model receives information about an item-retail location pair, such as an item in an order and a retail location 110 at which the order could be fulfilled. Items stored in the inventory database 204 may be identified by item identifiers. As described above, various item characteristics, some of which are specific to the retail location 110 (e.g., a time that the item was last found in the retail location 110, a time that the item was last not found in the retail location 110, the rate at which the item is found, the popularity of the item) may be stored for each item in the inventory database 204. Similarly, each retail location 110 may be identified by a retail location identifier and stored in a warehouse database along with information about the retail location 110. A particular item at a particular retail location 110 may be identified using an item identifier and a retail location identifier. In other embodiments, the item identifier refers to a particular item at a particular retail location, so that the same item at two different retail locations 110 is associated with two different identifiers. For convenience, both of these options to identify an item at a warehouse are referred to herein as an "item-retail location pair." Based on the identifier(s), the online concierge system 102 can extract information about the item and/or the retail location 110 from the inventory database 204 and/or retail location database, and provide this extracted information as inputs to the item availability model.

The machine-learned item availability model contains a set of functions generated by the modeling engine 218 from the training datasets 220 that relate the item, the retail location 110, and timing information, and/or any other relevant inputs, to the probability that the item is available at a retail location 110. Thus, for a given item-retail location pair, the machine-learned item availability model outputs a probability that the item is available at the retail location 110. The machine-learned item availability model constructs the relationship between the input item-retail location pair, timing, and/or any other inputs and the availability probability that is generic enough to apply to any number of different item-retail location pairs. In some embodiments, the probability output by the machine-learned item availability model includes a confidence score. The confidence score may be the error or uncertainty score of the output availability probability, and may be calculated using any standard statistical error measurement. In some examples, the confidence score is based in part on whether the item-retail location pair availability prediction was accurate for previous delivery orders (e.g., if the item was predicted to be available at the retail location and not found by the shopper, or predicted to be unavailable but found by the shopper). In some examples, the confidence score is based in part on the age of the data for the item, e.g., if availability information has been received within the past hour, or the past day. The set of functions of the machine-learned item availability model may be updated and adapted following retraining with new training datasets 220. The machine-learned item availability model may be any machine learning model, such as a neural network, boosted tree, gradient boosted tree or random forest model. In some examples, the machine-learned item availability model is generated from XGBoost algorithm. The item probability generated by the machine-learned item availability model may be used to determine instructions delivered to the customer 104 and/or shopper 108, as described in further detail below.

In various embodiments, item probability generated by the machine-learned item model is an input to a machine-learned model determining a likelihood of an order being incompletely fulfilled at a retail location 110. From information describing previously completed orders included in the training datasets 220, the modeling engine 218 trains the machine-learned model to determine a probability of a retail location 110 incompletely fulfilling an order. In various embodiments, the online concierge system 102 maintains criteria for identifying an incomplete order. For example, the online concierge system 102 identifies an incomplete order as an order for which the online concierge system 102 performed a refund that was not requested by a consumer from whom the order was received or as an order that included a replacement item for which a consumer from whom the order was received provided negative feedback or previously rejected as a replacement item. The online concierge system may also identify an incomplete order as an order for which the online concierge system 102 received a complaint from the consumer from whom the order was received (e.g., the consumer indicated the order was missing an item, the order included an incorrect item, the order included an unacceptable replacement item, etc.). The machine-learned model receives as input different characteristics of an order and characteristics of a retail location to fulfill the order and generates a probability of the retail location incompletely fulfilling the order. Example characteristics of an order include: availability of each item in the order from a retail location 110 fulfilling the order, replaceability of each item in the order for the user from whom the order was received, a number of items in the order, stored information by the online concierge system 102 describing items in the order, and inclusion of items in the order in orders previously identified as incomplete. Example characteristics of a retail location 110 include: a number of departments in the retail location 110 to be accessed to fulfill the order, a number of aisles in the retail location 110 to be accessed to fulfill the order and a location (e.g., a city, a state, or other geographic region) in which the retail location fulfilling the order (or in which the consumer from whom the order was received) is located. However, in other embodiments, the trained machine-learning model may use any suitable characteristics or combination of characteristics of an order, a consumer from whom the order was received, and a retail location fulfilling the order as inputs. From the characteristics of an order, a consumer from whom the order was received, and a retail location 110 fulfilling the order, the trained machine-learning model outputs a probability of the order being incomplete when fulfilled using the retail location 110.

In various embodiments, the modeling engine 218 trains the trained machine-learning model based on stored information in the training datasets 220 describing prior fulfillment of orders for different users using different retail locations 110. For example, the modeling engine 218 applies a label indicating whether a previously fulfilled order from the training datasets 220 was incompletely fulfilled or was completely fulfilled to characteristics of the previously fulfilled order and characteristics of the retail location 110 that fulfilled the previously fulfilled order. From the labeled characteristics of the previously fulfilled order and characteristics of the retail location 110 that fulfilled the previously fulfilled order, the modeling engine 218 trains the trained machine learning model using any suitable training method or combination of training methods. After training, the trained machine-learned model is stored and subsequently applied to characteristics of a received order and characteristics of a candidate retail location or fulfilling the received order, and the trained machine-learned model outputs a probability of the candidate retail location 110 incompletely fulfilling the received order.

In various embodiments, the modeling engine 218 also accounts for characteristics of a shopper fulfilling an order when training the trained machine-learned model to determine a probability of the shopper fulfilling an order at a candidate retail location 110 incompletely fulfilling the order. For example, in addition to characteristics of the order and characteristics of the candidate retail location 110, the trained machine-learning model also receives characteristics of a shopper fulfilling the order as an input. Example characteristics of a shopper include a propensity of refunds by the online concierge system 102 by orders fulfilled by the shopper, a satisfaction rate by customers of replacement items selected by the shopper, and a historical rate of incomplete orders by the shopper. When training the trained machine-learned model, as further described above, the online concierge system 102 also includes the shopper characteristics as an input, and the trained machine-learned model is applied to characteristics of an order, characteristics of a shopper fulfilling the order, and characteristics of a candidate retail location 110. In some embodiments, the one or more machine-learned models 222 include a shopper-specific machine-learned model applied to characteristics of a received order, characteristics of a retail location 110, and characteristics of a shoppers to determine a probability of a shopper incompletely fulfilling the order at the retail location 110. As further described above, the modeling engine 218 trains the shopper-specific machine-learned model based on characteristics of shoppers, characteristics of retail locations 110, and characteristics of orders from the training datasets 220. Hence, after selecting a retail location 110 to fulfill an order, the online concierge system 102 applies the shopper-specific machine-learned model to different combinations of shoppers and the selected retail location 110 to determine probabilities of different shoppers incompletely fulfilling the order at the selected retail location 110. As further described below in conjunction with FIG. 6, the online concierge system 102 uses the machine-learned model determining probabilities of an order being incompletely fulfilled to select a retail location 110 (or a retail location 110 and a shopper) to fulfill a received order.

In various embodiments, the training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, retail locations 110 associated with the previous delivery orders, and a variety of characteristics associated with each of the items (which may be obtained from the inventory database 204). Each piece of data in the training datasets 220 includes the outcome of a previous order (e.g., if the item was picked or not). The item characteristics may be determined by the machine-learned item availability model to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model may weight these factors differently, where the weights are a result of a "learning" or training process on the training datasets 220. The training datasets 220 are very large datasets taken across a wide cross section of retail locations 110, shoppers, items, warehouses, delivery orders, times and item characteristics. The training datasets 220 are large enough to provide a mapping from an item in an order to a probability that the item is available at a retail location 110. In addition to previous delivery orders, the training datasets 220 may be supplemented by inventory information provided by the inventory management engine 202. In some examples, the training datasets 220 are historic delivery order information used to train the machine-learned item availability model, whereas the inventory information stored in the inventory database 204 include factors input into the machine-learned item availability model to determine an item availability for an item in a newly received delivery order. In some examples, the modeling engine 218 may evaluate the training datasets 220 to compare a single item's availability across multiple retail locations 110 to determine if an item is chronically unavailable. This may indicate that an item is no longer manufactured. The modeling engine 218 may query a retail location 110 through the inventory management engine 202 for updated item information on these identified items.

Additionally, the training datasets 220 relate a variety of different factors to known complete or incomplete orders (i.e., if a previous order satisfied one or more criteria maintained by the online concierge system 102 indicating an order was incompletely fulfilled). The training datasets 220 include the items included in orders, an availability of the items included in the orders at the retail location 110 where the orders were fulfilled, whether the items in the previous orders were obtained, retail locations 110 associated with the previous orders, and a variety of characteristics associated with each of the items (which may be obtained from the inventory database 204), characteristics of a retail location 110 fulfilling an order (e.g., a number of departments in the retail location 110 to be accessed to fulfill the order, a number of aisles in the retail location 110 to be accessed to fulfill the order, a location of the retail location 110 fulfilling the order), and a location included in the order. Each piece of data in the training datasets 220 includes a label indicating whether a previous order was incompletely fulfilled or was completely fulfilled.

Figure 3A:
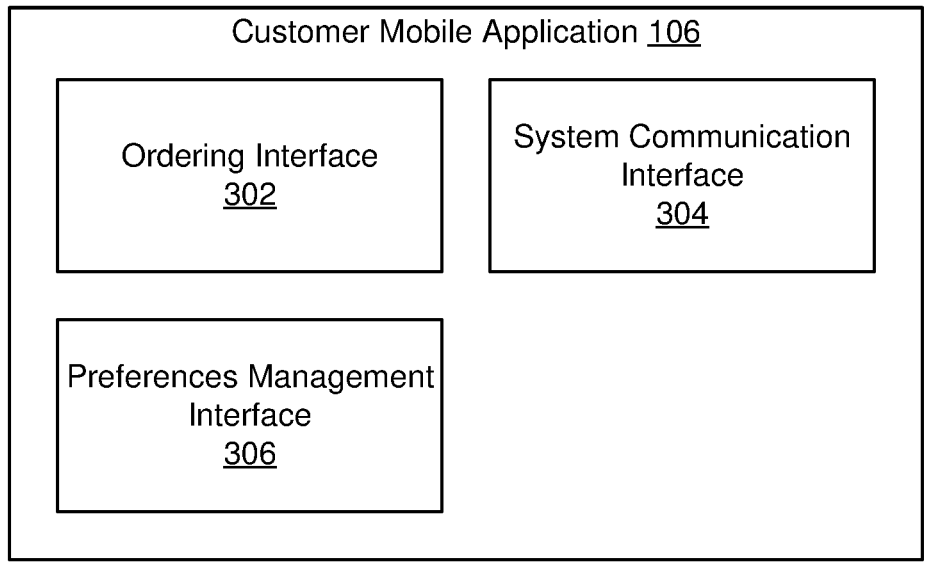
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface, known as a customer ordering interface, with which the customer 104 can browse through and select products and place an order.

Customers 104 may also use the customer ordering interface to message with shoppers 108 and receive notifications regarding the status of their orders. Customers 104 may view their orders and communicate with shoppers 108 regarding an issue with an item in an order using the customer ordering interface. For example, a customer 104 may respond to a message from a shopper 108 indicating that an item cannot be retrieved for the order by selecting a replacement option for the item or requesting a refund via buttons on the customer ordering interface. Based on the chosen course of action, the customer ordering interface generates and displays a template message for the customer 104 to send to the shopper 108. The customer 104 may edit the template message to include more information about the item or course of action and communicate back and forth with the shopper 108 until the issue is resolved.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred retail locations 110, preferred delivery times, special instructions for delivery, and so on.

Figure 3B:
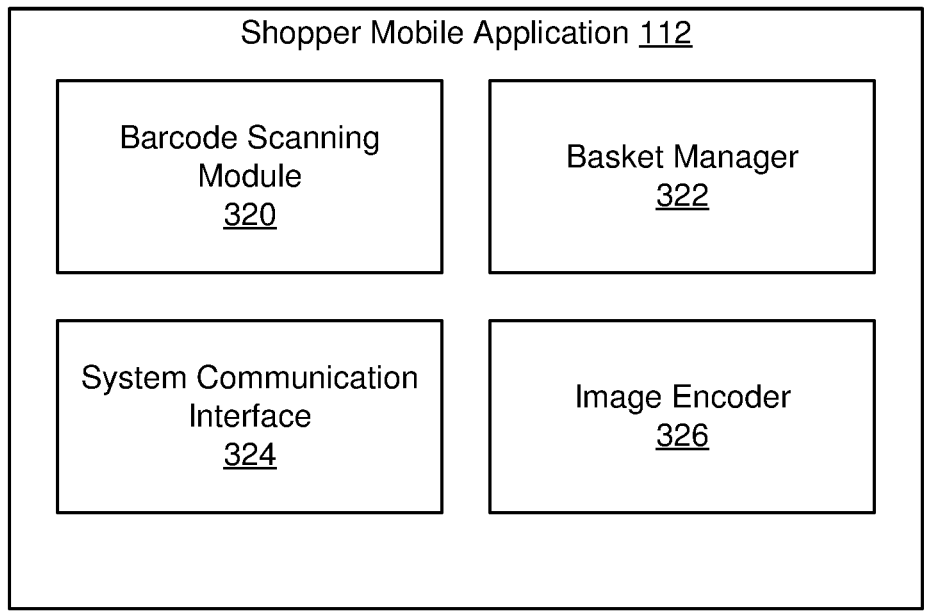
FIG. 3B is a block diagram of the shopper mobile application (PMA), according to one embodiment.

FIG. 3B is a block diagram of the shopper mobile application (SMA) 112, according to one embodiment. The shopper 108 accesses the SMA 112 via a mobile client device, such as a mobile phone or tablet. The SMA 112 may be accessed through an app running on the mobile client device or through a website accessed in a browser. The SMA 112 includes a barcode scanning module 320 which allows a shopper 108 to scan an item at a retail location 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. The SMA 112 also includes a basket manager 322 which maintains a running record of items collected by the shopper 108 for purchase at a retail location 110. This running record of items is commonly known as a "basket." In one embodiment, the barcode scanning module 320 transmits information describing each item (such as its cost, quantity, weight, etc.) to the basket manager 322, which updates its basket accordingly. The SMA 112 also includes an image encoder 326 which encodes the contents of a basket into an image. For example, the image encoder 326 may encode a basket of goods (with an identification of each item) into a QR code which can then be scanned by an employee of the retail location 110 at check-out.

The SMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may send this information to the order interface engine 328, which generates a shopper order interface.

A shopper order interface is an interactive interface through which shoppers 108 may interact message with customers 104 and receive notifications regarding the status of orders they are assigned. Shoppers 108 may view their orders through the shopper order interface and indicate when there is an issue with an item in an order, such as the item being out of stock or of poor quality. A shopper 108 may draft a message to a customer 104 associated with the order requesting clarification about what to do for the item given the issue. The shopper order interface displays template messages for the shopper 108 to choose from regarding the item and the shopper 108 may edit the template message to include more information about the item or a question for the customer 104. The shopper 108 communicates back and forth with the customer 104 until the issue is resolved.

Figure 4A:
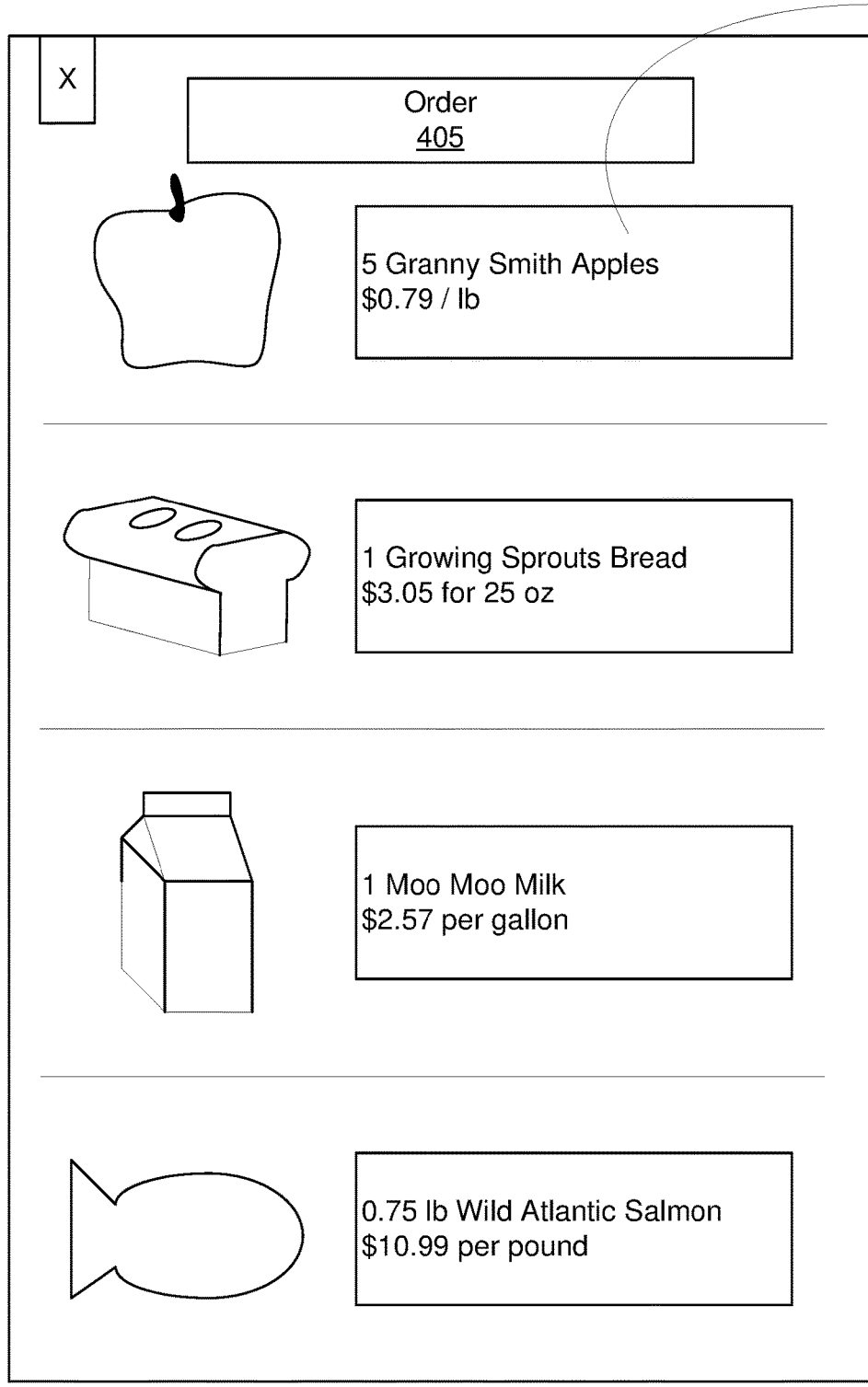
FIG. 4A is an example of a shopper order interface depicting an order on the shopper mobile application, according to one embodiment.

FIG. 4A is an example of a shopper order interface 400A depicting an order 405 on the shopper mobile application 112, according to one embodiment. A shopper 108 may use the shopper order interface 400A when gathering items 410 for an order 405 at a retail location 110. The shopper order interface 400A displays a scrollable list of items 410 in the order 405, including the brand or type of the item 410, the quantity ordered, the price of the item 410, and an image of the item 410. In other embodiments, the scrollable list may include other information about the items 410, such as quantity of each item 410 left in stock, location of each item 410 at the retail location 110, or name of the customer 104 associated with the order 405. A shopper 108 may scroll through the list to view more items 410 of the order 405 or may interact with an icon representing the item 410 to view more information about the item 410.

Figure 4B:
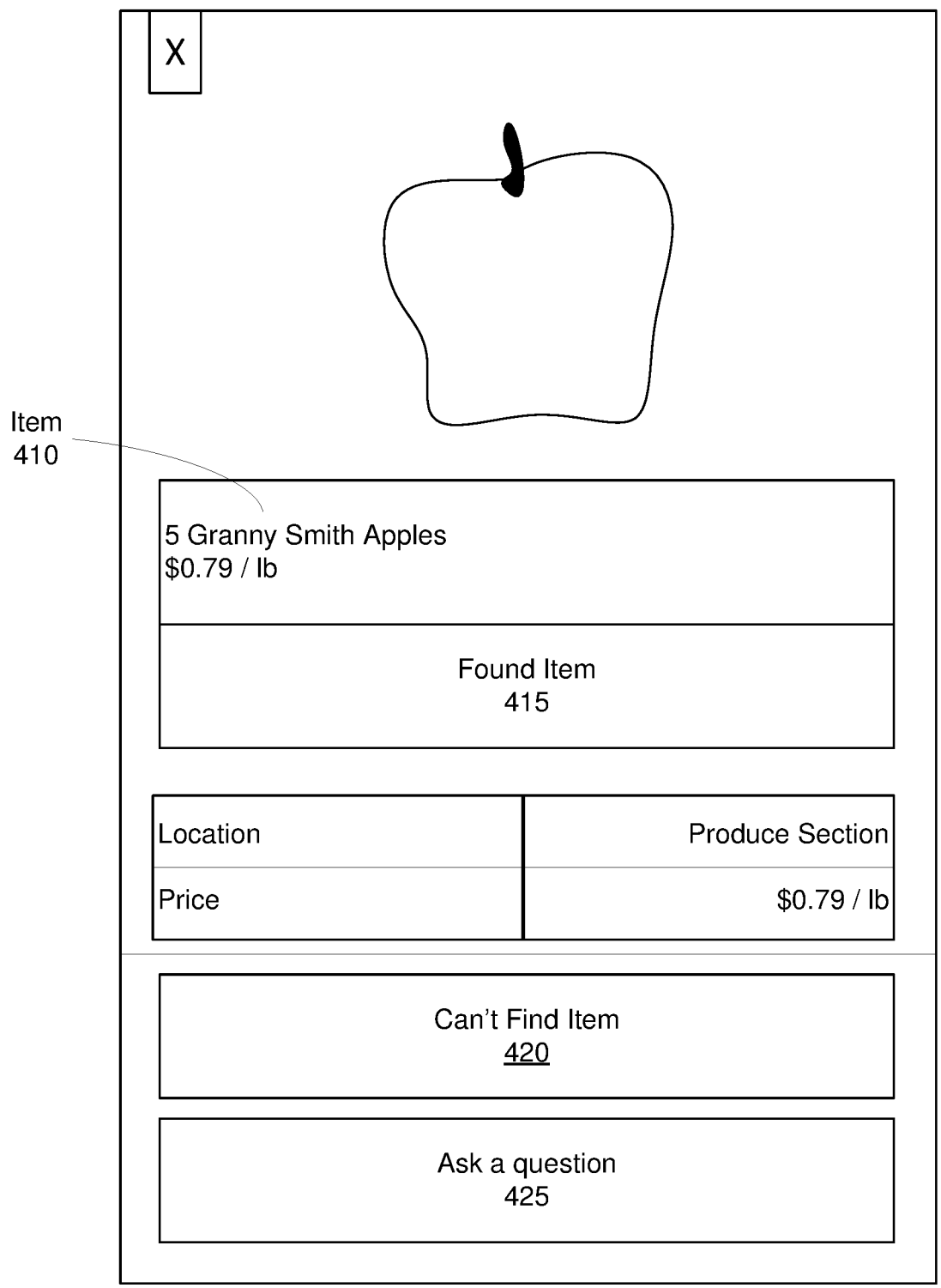
FIG. 4B is an example of a shopper order interface depicting an item from an order on the shopper mobile application, according to one embodiment.

FIG. 4B is an example of a shopper order interface 400B depicting an item 410 from an order 405 on the shopper mobile application 112, according to one embodiment. The shopper ordering interface 400B displays the item 410 (e.g., "Granny Smith Apples") and shows a price of the item 410, the location of the item 410 at the retail location 110, and the quantity ordered of the item 410. In other embodiments, the shopper order interface 400B may also display the other information about the item 410, such as a picture of the location of the item 410 at the retail location 110. The shopper ordering interface 400B includes several buttons and icons the shopper 108 may interact with. The shopper

108 may interact with the "Found Item" 415 button to indicate that they have found the item 410 at the retail location 110 and retrieved the item 410 for the order 405. If the shopper 108 cannot find the item 410, the shopper 108 may interact with the "Can't Find Item" 420 button to request a desired course of action for the item 410 from the customer 104. The shopper 108 may also interact with the "Ask a question" 425 button to send a custom message to the customer 104.

Figure 5:
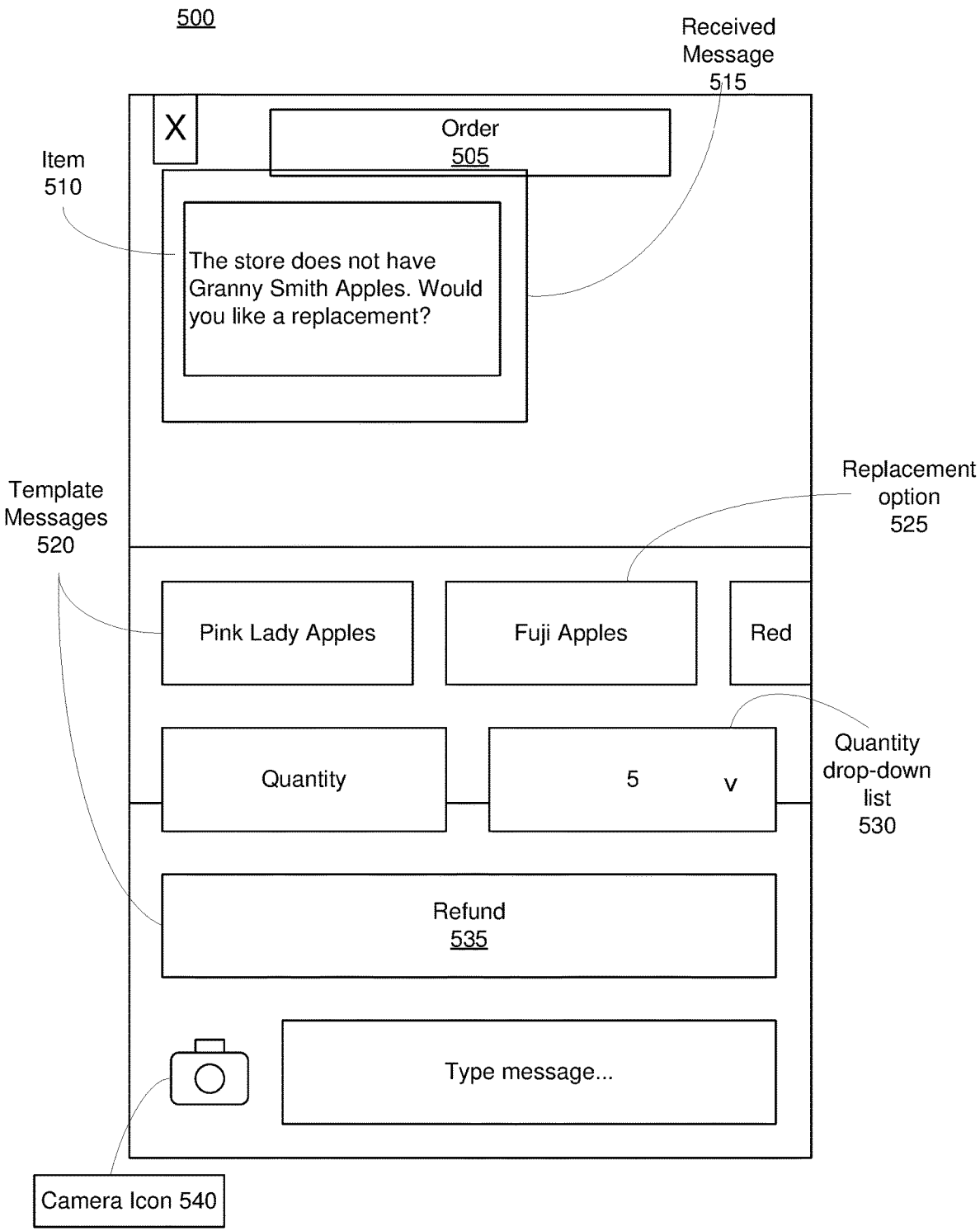
FIG. 5 is an example of a customer ordering interface displaying template messages for an item in an order on the customer mobile application, according to one embodiment.

FIG. 5 is an example of a customer ordering interface 500 displaying messages 520 for an item 510 in the order 505 on the customer mobile application 106, according to one embodiment. The customer ordering interface 500A displays a received message 515 from a shopper 108 indicating that there is an issue with an item 510 from a customer's 104 order 505. Along with the received message 515, the customer ordering interface 500A includes messages 520 the customer 104 may choose to designate a course of action for the item 510. As shown in FIG. 5A, a customer 104 may choose a template message 520 by interacting with buttons on the customer ordering interface 500. The template messages 520 indicate possible courses of action, such as requesting a replacement option 525 for the item 510, requesting a new quantity of the item 510 (chosen via a quantity drop-down list 515), or requesting a refund 535 of the item 510, among other remedies for the item.

In the customer ordering interface 500, the replacement options 525 for the item 510 "Granny Smith Apples" are displayed in a slider. Replacement options are items similar to the item 510, and the customer 104 may interact with the replacement options 525 by scrolling through the slider or selecting a replacement option to replace the item 510. In FIG. 5, the replacement options 525 include "Fuji Apples" and "Pink Lady Apples." In some embodiments, the customer 104 may choose a replacement option 525 by searching a database of replacement options 525 available at the retail location 110. When the customer 104 selects a replacement option 525 via the customer ordering interfaced 500, the online concierge system 102 stores an association between the customer 104, the item 510 and the selected replacement option 525, allowing the online concierge system 102 to maintain a record of items that the customer 104 accepts as replacements for the item 510. In other embodiments, the slider includes a "Show More Options" button that the customer 104 may interact with to see more replacement options 525. The customer ordering interface 500 also allows the customer 104 to alter the quantity of the item 510 using the quantity drop-down list 530, or, in some embodiments, by manually entering a quantity. The customer 104 may also may interact with the camera icon 540 to take a picture of an item 510 for the shopper 108 to find as a replacement. In other embodiments, the customer 104 may type a message to the shopper 108, instead of selecting a template message 520, to indicate a custom course of action for the item 510.

Figure 6:
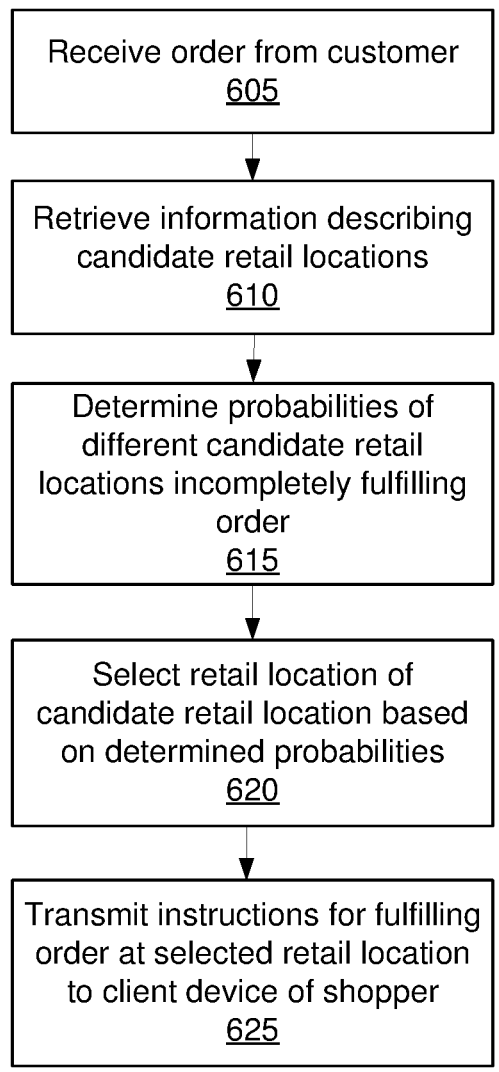
FIG. 6 is a flowchart of a method for selecting a retail location to fulfill an order received by an online concierge system based on probabilities of retail locations incompletely fulfilling the order, according to one embodiment.

FIG. 6 is a flowchart of one embodiment of a method for selecting a retail location, also referred to as a "location," to fulfill an order received by an online concierge system 102 based on probabilities of retail locations 110 incompletely fulfilling the order. In other embodiments, the method may include different or additional steps than those described in conjunction with FIG. 6. Further, in some embodiments, the method may perform the steps of the method in a different order than the order described in conjunction with FIG. 6.

As further described above in conjunction with FIGS. 1 and 2, the online concierge system 102 receives 605 an order from a customer. The order includes one or more items and identifies the customer from which the order was received 605. To fulfill the order, the online concierge system 102 retrieves 610 information stored by the online concierge system 102 describing one or more candidate retail locations. In some embodiments, the online concierge system 102 identifies candidate retail locations as retail locations within a threshold distance of a physical location included in the order (e.g., a physical location to which items in the order are to be delivered). Alternatively, the online concierge system 102 identifies candidate retail locations as retail locations having inventories including at least a threshold amount of goods included in the order. As further described above in conjunction with FIG. 2, information describing a candidate retail location includes inventory information describing the candidate retail location's inventory of goods.

To select a retail location from the candidate retail locations to fulfill the received order, the online concierge system 102 accounts for probabilities of different candidate retail locations resulting in an incomplete order. In various embodiments, the online concierge system 102 maintains criteria for identifying an incomplete order. For example, the online concierge system 102 identifies an incomplete order as an order for which the online concierge system 102 performed a refund that was not requested by a consumer from whom the order was received 605 or as an order that included a replacement item for which a consumer from whom the order was received 605 provided negative feedback or previously rejected as a replacement item. The online concierge system 102 may also identify an incomplete order as an order for which the online concierge system 102 received a complaint from the consumer from whom the order was received 605 (e.g., the consumer indicated the order was missing an item, the order included an incorrect item, the order included an unacceptable replacement item, etc.).

From information describing previously completed orders, the online concierge system 102 trains a machine-learned model to determine a probability of different candidate retail locations incompletely fulfilling an order. The machine-learned model receives as input different characteristics of an order and characteristics of a retail location to fulfill the order and generates a probability of the retail location incompletely fulfilling the order. Example characteristics of an order include: availability of each item in the order from a retail location 110 fulfilling the order, replaceability of each item in the order for the user from whom the order was received, a number of items in the order, stored information by the online concierge system 102 describing items in the order, and inclusion of items in the order in orders previously identified as incomplete. Example characteristics of a retail location 110 include: a number of departments in the retail location 110 to be accessed to fulfill the order, a number of aisles in the retail location 110 to be accessed to fulfill the order and a location (e.g., a city, a state, or other geographic region) in which the retail location fulfilling the order (or in which the consumer from whom the order was received) is located. However, in other embodiments, the trained machine-learning model may use any suitable characteristics or combination of characteristics of an order, a consumer from whom the order was received, and a retail location fulfilling the order as inputs. From the characteristics of an order, a consumer from whom the order was received, and a retail location 110 fulfilling the order, the trained machine-learning model outputs a probability of the order being incomplete when fulfilled using the retail location 110. In various embodiments, the online concierge system 102 trains the trained machine-learning model based on stored information describing prior fulfillment of orders for different users using different retail locations 110. For example, the online concierge system 102 applies a label indicating whether a previously fulfilled order was incompletely fulfilled or was completely fulfilled to characteristics of the previously fulfilled order, characteristics of the consumer from whom the previously fulfilled order was received, and characteristics of the retail location 110 that fulfilled the previously fulfilled order. From the labeled characteristics of the previously fulfilled order, characteristics of the consumer from whom the previously fulfilled order was received, and characteristics of the retail location 110 that fulfilled the previously fulfilled order, the online concierge system 102 trains the trained machine learning model using any suitable training method or combination of training methods. After training, the online concierge system 102 applies the trained machine-learned model to characteristics of a received order, characteristics of a consumer from whom the order was received 605, and characteristics of a candidate retail location 110 for fulfilling the received order, and the trained machine-learned model outputs a probability of the candidate retail location 110 incompletely fulfilling the received order.

In various embodiments, the online concierge system 102 also accounts for characteristics of a shopper fulfilling an order when training the trained machine-learned model to determine a probability of the shopper fulfilling an order at a candidate retail location 110 incompletely fulfilling the order. For example, in addition to characteristics of the order and characteristics of the candidate retail location 110, the trained machine-learning model also receives characteristics of a shopper fulfilling the order as an input. Example characteristics of a shopper include a propensity of refunds by the online concierge system 102 by orders fulfilled by the shopper, a satisfaction rate by customers of replacement items selected by the shopper, and a historical rate of incomplete orders by the shopper. When training the trained machine-learned model, as further described above, the online concierge system 102 also includes the shopper characteristics as an input, and the trained machine-learned model is applied to characteristics of an order, characteristics of a shopper fulfilling the order, and characteristics of a candidate retail location 110.

The online concierge system 102 determines 615 a probability of each candidate retail location 110 incompletely fulfilling the received order. In some embodiments, the online concierge system 102 also determines distances between each of the candidate retail locations 110 and a location included in the received order. From the likelihoods of each candidate retail location 110 incompletely fulfilling the received order and the distances between each of the candidate retail locations 110 and the location included in the received order, the online concierge system 102 selects 620 a candidate retail location 110 to fulfill the received order. In some embodiments, the online concierge system 102 generates a metric for each candidate retail location 110, with a metric for a candidate retail location 110 generated by combining a value based on probability of the candidate retail location 110 incompletely fulfilling the order and a value based on a distance from the candidate retail location 110 to the location included in the received order. For example, the value based on the probability of the candidate retail location 110 incompletely fulfilling the order is inversely related to the probability of the candidate retail location 110 incompletely fulfilling the order, so the value is greater for candidate retail locations 110 with lower probabilities of incompletely fulfilling the order. Similarly, the value based on a distance from the candidate retail location 110 to the physical location included in the received order may also be inversely related to the distance from the candidate retail location to the physical location included in the received order, so the value is greater for candidate retail locations 110 closer to the location included in the received order. The online concierge system 102 may apply different weights to the value based on the probability of the candidate retail location 110 incompletely fulfilling the order and the value based on a distance from the candidate retail location 110 to the location included in the received order when generating the metric for the candidate retail location 110. For example, the online concierge system 102 applies a larger weight to the value based on the probability of the candidate retail location 110 incompletely fulfilling the order and a smaller weight to the value based on a distance from the candidate retail location 110 to the location included in the received order. The online concierge system 102 selects 620 a retail location 110 with a maximum metric of the candidate retail locations. In embodiments where the online concierge system 102 applies a larger weight to the value based on probability of the candidate retail location 110 incompletely fulfilling the order, the online concierge system 102 optimizes selection of a retail location 110 of the candidate retail locations 110 for higher quality retail locations 110 that are more likely to result in a shopper completely fulfilling the received order.

In other embodiments, the online concierge system 102 selects 620 a retail location 110 of the candidate retail locations 110 based on the probabilities of different candidate retail locations 110 incompletely fulfilling the received order. For example, the online concierge system 102 selects 620 a retail location 110 of the candidate retail locations 110 having a minimum probability of incompletely fulfilling the received order. As another example, the online concierge system 102 ranks the candidate retail locations 110 based on their corresponding probabilities of incompletely fulfilling the received order, so candidate retail locations 110 having lower probabilities of incompletely fulfilling the received order have higher positions in the ranking, and selects a set of candidate retail locations 110 having at least a threshold position in the ranking. In some embodiments, the online concierge system 102 selects 620 a candidate retail location 110 of the set having a minimum distance to a location included in the order. Alternatively, the online concierge system 102 displays information identifying different candidate retail locations 110 in an order based on the ranking of candidate retail locations 110 based on probabilities of incompletely fulfilling the received order, so candidate retail locations 110 having lower probabilities of incompletely fulfilling the received order are displayed in higher positions of the order. This ordering allows a shopper, or the consumer, to more easily select 620 a candidate retail location that has a lower probability of incompletely fulfilling the received order.

In embodiments where the online concierge system 102 accounts for characteristics of a shopper fulfilling an order in the trained machine-learned model, the online concierge system 102 selects a combination of a retail location of the candidate retail locations 110 and a shopper to fulfill the received order. In some embodiments, the online concierge system 102 selects a retail location of the candidate retail locations 110, as further described above, and applies a shopper-specific machine-learned model to characteristics of the received order, characteristics of the selected retail location 110, and characteristics of different shoppers to determine probabilism of different shoppers incompletely fulfilling the received order at the selected retail location 110. The online concierge system 102 trains the shopper-specific machine-learned model as further described above in various embodiments. To select a shopper for fulfilling the received order, the online concierge system 102 ranks shoppers based on probabilities of different shoppers incompletely fulfilling the received order at the selected retail location 110 so shoppers with lower probabilities of incompletely fulfilling the received order have higher positions in the ranking and selects a shopper having a highest position in the ranking. Alternatively, the online concierge system 102 selects a shopper having a minimum probability of incompletely fulfilling the order at the selected retail location 110. In other embodiments, application of the trained machine-learned model to characteristics of the order, characteristics of different candidate retail locations 110, and characteristics of shoppers allows the online concierge system 102 to select a combination of a retail location 110 and a shopper to fulfill the received order. The online concierge system 102 transmits 625 one or more instructions for fulfilling the received order to a client device of the selected shopper for fulfillment at the selected retail location 110.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
 receiving, at an online system comprising one or more processors, an order from a client device of a customer, the order including one or more items;
 responsive to receiving the order,
  accessing, by the one or more processors of the online system, a machine-learned model trained on a set of training data, the set of training data describing characteristics of a plurality of candidate locations, and characteristics of a plurality of historical orders that were fulfilled at the plurality of candidate locations, wherein the training comprises:
   identifying whether each of the plurality of historical orders is incompletely fulfilled based on characteristics of the plurality of historical orders;

obtaining training examples comprising a plurality of order-location pairs, wherein each of the plurality of order-location pairs corresponds to a specific order in the plurality of historical orders, a specific location in the plurality of candidate locations where the order is fulfilled, and each of the plurality of order-location pairs is labeled based on whether the specific order is identified as incompletely fulfilled at the specific location, applying each of the training examples to the machine-learned model to predict a probability that the corresponding order is incompletely fulfilled at the corresponding location; and updating the machine-learned model based on comparisons between the labels of the plurality of order-location pairs and the respective predictions generated by the machine-learned model;

retrieving, by the one or more processors of the online system, information describing one or more candidate locations for fulfilling the order;

determining, by the one or more processors of the online system, a probability of each of the one or more candidate locations incompletely fulfilling the received order, the probability of each of the one or more candidate locations incompletely fulfilling the received order determined by applying the trained machine-learned model to characteristics of the corresponding candidate location and to characteristics of the received order;

selecting, by the one or more processors of the online system, a location of the candidate locations having a minimum probability of incompletely fulfilling the received order;

maintaining, by the one or more processors of the online system, locations of a plurality of shopper client devices, each of the plurality of shopper client devices associated with a shopper;

determining, by the one or more processors of the online system, proximity of the plurality of shopper client devices to the selected candidate location for fulfilling the received order;

selecting, by the one or more processors of the online system, one or more shoppers, based in part on corresponding shopper client devices' proximity to the selected candidate location, who are eligible to fulfill the received order;

transmitting, by the one or more processors of the online system, an instruction to fulfill the received order at the selected location to corresponding one or more client devices of the selected one or more shoppers;

receiving, by the one or more processors of the online system, from the one or more client devices of the selected one or more shoppers data identifying the selected candidate location and the received order;

identifying whether the received order is completely fulfilled;

labeling the order location pair, indicating whether the received order is identified as completely or incompletely fulfilled at the specific location; and updating the machine-learned model based on a comparison between the labeled order location pair and the probability of the selected candidate location incompletely fulfilling the received order determined by the machine-learned model.

2. The method of claim 1, wherein characteristics of the received order comprise one or more of: an availability of each item in the received order from each of the one or more candidate locations, a replaceability of each item in the order for the customer from whom the received order was received, a number of items in the received order, stored information describing items in the received order, or inclusion of items in the received order in orders previously identified as incomplete.

3. The method of claim 2, wherein the availability of an item in the received order from each of the one or more candidate location is determined by applying a machine-learned availability model to a combination of the item and the corresponding candidate location.

4. The method of claim 1, characteristics of each of the one or more candidate locations are selected from a group consisting of: a number of departments in the corresponding candidate location to be accessed to fulfill the received order, a number of aisles in the corresponding candidate location to be accessed to fulfill the received order, or a physical location in which the corresponding candidate location is located.

5. The method of claim 1, wherein the received order includes a physical location.

6. The method of claim 5, wherein retrieving, by the online system, information describing one or more candidate locations for fulfilling the order comprises:

identifying locations within a threshold distance of the physical location included in the order; and retrieving information describing each of the identified locations.

7. The method of claim 5, wherein selecting the location of the candidate locations having the minimum probability of incompletely fulfilling the received order comprises:

generating a metric for each candidate location by combining a value based on the probability of the candidate location incompletely fulfilling the received order and a value based on a distance between a physical location of the candidate location and the physical location included in the order; and selecting a candidate location having a maximum metric.

8. The method of claim 7, wherein generating the metric for each candidate location by combining the value based on the probability of the candidate location incompletely fulfilling the received order and the value based on a distance between the physical location of the candidate location and the physical location included in the order comprises:

applying a weight to the value based on the probability of the candidate location incompletely fulfilling the received order;

applying a different weight to the value based on the distance between the physical location of the candidate location and the physical location included in the order; and combining the value based on the probability of the candidate location incompletely fulfilling the received order after application of the weight and the value based on the distance between the physical location of the candidate location and the physical location included in the order after application of the different weight.

9. The method of claim 8 wherein the weight is greater than the different weight.

10. The method of claim 1, wherein an incompletely fulfilled order is an order for which the online system performed a refund that was not requested by a consumer from whom the order was received, or an order that included a replacement item for which a consumer from whom the order was received provided negative feedback or previously rejected when fulfilling the order.

11. A computer program product comprising a non-transitory computer-readable storage medium having instructions encoded thereon that, when executed by a processor, cause the processor to:
receive, at an online concierge system, an order from a customer client device, the order including one or more items;
responsive to receiving the order,
access a machine-learned model trained on a set of training data, the set of training data describing characteristics of a plurality of candidate locations, and characteristics of a plurality of historical orders that were fulfilled at the plurality of candidate locations, wherein the training comprises:
identifying whether each of the plurality of historical orders is incompletely fulfilled based on characteristics of the plurality of historical orders;
obtaining training examples comprising a plurality of order-location pairs, wherein each of the plurality of order-location pairs corresponds to a specific order in the plurality of historical orders, a specific location in the plurality of candidate locations where the order is fulfilled, and each of the plurality of order-location pairs is labeled based on whether the specific order is identified as incompletely fulfilled at the specific location,
applying each of the training examples to the machine-learned model to predict a probability that the corresponding order is incompletely fulfilled at the corresponding location; and
updating the machine-learned model based on comparisons between the labels of the plurality of order-location pairs and the respective predictions generated by the machine-learned model;
retrieve information describing one or more candidate locations for fulfilling the order;
determine a probability of each of the one or more candidate locations incompletely fulfilling the received order, the probability of each of the one or more candidate locations incompletely fulfilling the received order determined by applying the trained machine-learned model to characteristics of the corresponding candidate location and to characteristics of the received order;
select, by one or more processors of the online system, a location of the candidate locations having a minimum probability of incompletely fulfilling the received order;
maintain, by the one or more processors of the online system, locations of a plurality of shopper client devices, each of the plurality of shopper client devices associated with a shopper;
determine, by the one or more processors of the online system, proximity of the plurality of shopper client devices to the selected candidate location for fulfilling the received order;
select, by the one or more processors of the online system, one or more shoppers, based in part on corresponding shopper client devices' proximity to the selected candidate location, who are eligible to fulfill the received order; and
transmit, by the one or more processors of the online system, an instruction to fulfill the received order at the selected location to corresponding one or more client devices of the selected one or more shoppers;
receive, by the one or more processors of the online system, from the one or more client devices of the selected one or more shoppers, data identifying the selected candidate location and the received order;
identify whether the received order is completely fulfilled;
label the order location pair, indicating whether the received order is identified as completely or incompletely fulfilled at the specific location; and
update the machine-learned model based on a comparison between the labeled order location pair and the probability of the selected candidate location incompletely fulfilling the received order determined by the machine-learned model.

12. The computer program product of claim 11, wherein characteristics of the received order comprise one or more of: an availability of each item in the received order from the candidate location, a replaceability of each item in the order for the customer from whom the received order was received, a number of items in the received order, stored information by the online concierge system describing items in the received order, or inclusion of items in the received order in orders previously identified as incomplete.

13. The computer program product of claim 12, wherein the availability of an item in the received order from each of the one or more candidate locations is determined by applying a machine-learned availability model to a combination of the item and the candidate location.

14. The computer program product of claim 11, wherein characteristics of each of the one or more candidate locations are selected from a group consisting of: a number of departments in the corresponding candidate location to be accessed to fulfill the received order, a number of aisles in the corresponding candidate location to be accessed to fulfill the received order, or a physical location in which the corresponding candidate location is located.

15. The computer program product of claim 11, wherein the received order includes a physical location.

16. The computer program product of claim 15, wherein retrieve, by the online concierge system, information describing one or more candidate locations for fulfilling the order comprises:
identify locations within a threshold distance of the physical location included in the order; and
retrieve information describing each of the identified locations.

17. The computer program product of claim 11, wherein select the location of the candidate locations having the minimum probability of incompletely fulfilling the received order comprises:
generate a metric for each candidate location by combining a value based on the probability of the candidate location incompletely fulfilling the received order and a value based on a distance between a physical location of the candidate location and the physical location included in the order; and
select a candidate location having a maximum metric.

18. The computer program product of claim 17, wherein generate the metric for each candidate location by combining the value based on the probability of the candidate location incompletely fulfilling the received order and the value based on a distance between the physical location of the candidate location and the physical location included in the order comprises:
apply a weight to the value based on the probability of the candidate location incompletely fulfilling the received order;

apply a different weight to the value based on the distance between the physical location of the candidate location and the physical location included in the order; and combine the value based on the probability of the candidate location incompletely fulfilling the received order after application of the weight and the value based on the distance between the physical location of the candidate location and the physical location included in the order after application of the different weight.

19. The computer program product of claim 18, wherein the weight is greater than the different weight.

20. The computer program product of claim 11, wherein an incompletely fulfilled order is an order for which the online concierge system performed a refund that was not requested by a consumer from whom the order was received, or an order that included a replacement item for which a consumer from whom the order was received provided negative feedback or previously rejected when fulfilling the order.

* * * * *